United States Patent [19]
Nie et al.

[11] Patent Number: 5,902,698
[45] Date of Patent: May 11, 1999

[54] ION CONDUCTIVE MATERIAL AND ELECTROCHEMICAL DEVICE COMPRISING THE SAME

[75] Inventors: Jin Nie, Kasuga; Fusaji Kita, Otokuni-gun; Koji Murakami, Ibaraki; Akira Kawakami, Takatsuki; Hiroshi Kobayashi, Chikushino; Takaaki Sonoda, Fukuoka, all of Japan

[73] Assignee: Hitachi Maxell, Ltd., Osaka-fu, Japan

[21] Appl. No.: 08/609,915

[22] Filed: Feb. 29, 1996

[30] Foreign Application Priority Data

Apr. 14, 1995 [JP] Japan ................................... 7-113549

[51] Int. Cl.⁶ ..................................... H01M 6/14
[52] U.S. Cl. .......................... 429/194; 204/242; 204/400; 252/62.2
[58] Field of Search .......................... 252/62.2; 429/194; 204/400, 242

[56] References Cited

U.S. PATENT DOCUMENTS

| | | | |
|---|---|---|---|
| 5,260,145 | 11/1993 | Armand et al. | 429/50 |
| 5,352,547 | 10/1994 | Kita et al. | 429/194 |
| 5,437,944 | 8/1995 | Kita et al. | 429/195 |
| 5,514,493 | 5/1996 | Waddell et al. | 429/199 |
| 5,527,644 | 6/1996 | Kita et al. | 429/247 |

OTHER PUBLICATIONS

Jin Nie, "Polyfluorinated Weakly Coordinating Organic Anions," Mar. 1, 1995, Kyushu University, pp. 134–142.

*Primary Examiner*—Kathryn Gorgos
*Assistant Examiner*—Thomas H. Parsons
*Attorney, Agent, or Firm*—Birch, Stewart, Kolasch & Birch, LLP

[57] ABSTRACT

An ion conductive material containing a compound which comprises a resonance structure group which contains an atom of the Vb group in the Periodic Table serving as an anionic site and is bonded to an electron attractive organic group through an atom of the VIb group in the Periodic Table, and a counter ion selected from the group consisting of metal ions and a hydrogen ion. This material is useful as an electrolyte of a cell since it is excellent in high voltage stability.

16 Claims, No Drawings

ION CONDUCTIVE MATERIAL AND ELECTROCHEMICAL DEVICE COMPRISING THE SAME

BACKGROUND OF THE INVENTION

1. Field of the Invention

The present invention relates to an ion conductive material and an electrochemical device comprising the same. In particular, the present invention relates to an ion conductive material which is excellent in a high voltage stability such as an electrolyte, and an electrochemical device such as a cell, an electrolytic system, an electrochemical sensor, and so on.

2. Description of the Related Art

Since an electrochemical device which is represented by a manganese dioxide-lithium cell can generate a high voltage of about 3 V and has a high energy density, the demand therefor is increasing. Recently, a lithium ion secondary cell using $LiCoO_2$ and carbon has been developed, and the demand therefor has been greatly increased, since it can generate a high voltage of about 3.6 V.

Hitherto, as an electrolyte of such type of the cell, a perchlorate compound such as $LiClO_4$ is used, but it is less used recently because of the problem of safety. It has been proposed to improve the safety and reliability of the device by dispersing various lithium salts including above $LiClO_4$ in a polymer such as polyethylene oxide (PEO) to form a solid ion conductive material. However, the formation of the solid ion conductive material will decrease the ion conductivity considerably.

It has been proposed to use an organic lithium salt such as $LiB(C_6H_5)_4$, $LiCF_3SO_3$, $LiCF_3CO_2$, $LiN(CF_3SO_2)_2$, $LiC(CF_3SO_2)_3$, etc. as an electrolyte instead of $LiClO_4$.

But, above $LiB(C_6H_5)_4$ has problems that it has insufficient high voltage stability, and its storage stability is low depending on a kind of a solvent. In addition, an electrolytic solution comprising a solution of $LiB(C_6H_5)_4$ dissolved in an organic solvent (a liquid ion conductive material) is discolored during storage, or some kind of the solvent is polymerized. As a result, the performance of the cell comprising such electrolytic solution decreases during the storage.

The organic lithium salts such as $LiCF_3SO_3$, $LiCF_3CO_2$, $LiN(CF_3SO_2)_2$, $LiC(CF_3SO_2)_3$, etc. have better safety than $LiClO_4$, but have problems that oxidation stability is poor, stability at a high voltage is low, and ion conductivity is low, Additionally, they may not be used together with some materials of electrode collectors, and they are expensive.

SUMMARY OF THE INVENTION

An object of the present invention is to solve the above described problems of the conventional ion conductive materials and the problems of the electrochemical devices using such conductive materials, and to provide an ion conductive material and an electrochemical device which are excellent in high voltage stability.

Accordingly, the present invention provides an ion conductive material containing a compound which comprises a resonance structure group which contains an atom of the Vb group in the Periodic Table serving as an anionic site and is bonded to an electron attractive organic group through an atom of the VIb group in the Periodic Table, and a counter ion selected from the group consisting of metal ions and a hydrogen ion, and an electrochemical device comprising said ion conductive material.

According to the present invention, the above compound can increase high voltage stability of a nonaqueous cell above all.

DETAILED DESCRIPTION OF THE INVENTION

In the present invention, when the above compound to be used in the ion conductive material is a low molecular weight compound, it is a metal salt as a solute to be dissolved in an organic solvent to form a liquid ion conductive material (an electrolytic solution). When it is a high molecular weight polymer, the compound as such forms an ion conductive structural material and can be used as a solid ion conductive material. In the latter case, the above compound has plural. sites which can form pairs with cations in a molecule. Herein, the site which can form a pair with a cation will be referred to as an anionic site both in the case of the metal salt and in the case of the polymer. The anionic site is preferably a resonance structure group.

In the present invention, the electrochemical device is intended to mean a device comprising an electrode and the ion conductive material, for example, a cell, an electrolytic system, an electrochemical sensor, etc. The ion conductive material comprising the above compound according to the present invention is used particularly in the cell, more preferably in a nonaqueous cell which is required to have a voltage resistance at the high voltage. When the maximum voltage of the cell in relation to Li is 4.0 V or higher, the effects of the ion conductive material of the present invention are effectively achieved. The ion conductive material of the present invention is more preferably used in a cell having the maximum voltage of 4.1 V or higher, most preferably in a cell having the maximum voltage of 4.2 V or higher.

Herein the present invention will be explained by making reference to a cell, but the device of the present invention is not limited to the cell.

A reason why the inclusion of the above specific compound in the ion conductive material can improve the high voltage stability of the ion conductive material and the cell will be clarified in the following explanation of the above compound.

First, the present invention has been completed based on the finding that, as one of criteria for the stability of the ion conductive material against oxidation, a degree of electron liberation can be used, which is obtained by measuring to what extent the electrically negatively charged anion liberates the electrons, and how easily it is oxidized.

That is, HOMO (highest occupied molecular orbital) energies of various anions can be calculated using a semiempirical molecular orbital method. Since the HOMO energy is an energy level of an unstable electron orbital at which the anion is most easily liberated in vacuum, the smaller HOMO energy may mean the better staility to oxidation.

Tables 1 and 2 show the HOMO energies of conventional imides and the imides of the present invention, which are calculated using the MNDO (modified neglect of differential overlap) method which is one of the semiempirical molecular orbital method by MOPAC (CAChe System) wherein MOPAC refers to Molecular Orbital Package.

From Table 1, it is understood that the imides of the present invention comprising the $RfOSO_2$ group have the lower HOMO energies and better staility to oxidation than one having the $RfSO_2$ group.

As shown in Table 2, the imides of the present invention have the lower HOMO energies than the conventional $(CF_3SO2)_2N$-type anion.

TABLE 1

| Anion | HOMO energy (eV) |
|---|---|
| $(CF_3SO_2)_2N-$ | −8.19 |
| $(CF_3OSO_2)_2N-$ | −8.61 |
| $(C_4F_9OSO_2)(CF_3OSO_2)_2N-$ | −8.75 |
| $(C_8F_{17}OSO_2)(CF_3OSO_2)_2N-$ | −8.77 |

TABLE 2

| Anion | HOMO energy (eV) |
|---|---|
| $(CF_3OSO_2)_2N-$ | −8.61 |
| $(CF_3CH_2OSO_2)_2N-$ | −8.28 |
| $(CF_3CF_2CH_2OSO_2)_2N-$ | −8.38 |
| $[(CF_3)_2CHOSO_2]_2N-$ | −8.91 |
| $(CF_3SO_2)_2N-$ | −8.19 |

Second, the present invention has been completed based on the finding that, since the atom of the Vb group of the Periodic Table such as a nitrogen atom or a phosphorus atom which constitutes the center of the anionic site of the above compound of the present invention (hereinafter referred to as "anionic center") has a relatively low electronegativity, when such atom forms the anionic center, high oxidation stability is expected because of less liberation of the electron at the cell voltage of 3 V or higher.

To the Vb group atom, two or more groups having resonance structures for stabilizing this atom (e.g. a $SO_2$ group, a CO group, etc.) can be bonded, whereby the oxidation stability is preferably improved. According to the present invention, a "resonance structure group" is a group having a resonance structure. In the context of the Vb atom, this "resonance structure group" stabilizes the Vb atom. Among the Vb group atoms, those in the second and third periods are preferred. In particular, those in the second period are preferred. Examples of the resonance structure group are a SOgroup, a CO group, a $PO_x$ group, a $NO_x$ group, and so on. Among them, the $SO_2$ group and the CO group are preferred, and the $SO_2$ group is more preferred. Then, the most preferred resonance structure group is a $(-SO_2)_2N-$ group.

The most characteristic feature of the compound to be used in the present invention (hereinafter referred to as "present compound") is that the oxidation of the anionic site is prevented by bonding the electron attractive organic group to the anionic site through the VIb group atom to stabilize the anionic site.

The electron attractive organic group withdraws the electrons from the anionic center atom to decrease an electron density of the anionic center atom and suppress the liberation of the electrons from the anionic center, whereby the oxidation of the anion is prevented. The VIb group atom which intervenes between the electron attractive group and the anionic site have the highest electronegativity among atoms having two valences, and then further improves the function of the electron attractive organic group. When the VIb group atom intervenes, the length of the substituent group is increased so that steric hindrance of the group is enlarged, and the high voltage stability of the present compound is improved when the ion conductive material is combined with a metal of the positive electrode collector. In particular, the presence of the intervening VIb group atom has the large effect with a collector metal which forms a trivalent ion when it is dissolved, such as aluminum.

For example, $(RfOSO_2)_2NLi$ which belongs to the present compound has the better oxidation stability than conventional $(RfSO_2)_2NLi$ (disclosed in U.S. Pat. No. 5,260,145 to Michel Armand). Examples of the VIb group atom are the oxygen atom, the sulfur atom, and so on. In particular, the oxygen atom is preferred, since it hardly has more than two valences and can bond the electron attractive organic group to the anionic site with less steric hindrance, whereby the high voltage stability is greatly improved.

Examples of the electron attractive group to be bonded to the anionic site through the VIb group atom are straight or branched halogenated alkyl groups, a cyano group, etc. Among them, the straight or branched halogenated alkyl groups, in particular, fluoroalkyl groups are preferred. The number of carbon atoms of the alkyl group is not limited, since the increase of the number of carbon atoms of the halogenated alkyl group can increase the electron attraction. Preferably, the number of carbon atoms is 20 or less in view of the solubility of the present compound in an organic solvent.

The halogenated alkyl group may contain a nitrogen or oxygen atom.

Preferably, the halogenated alkyl group is bonded to the VIb group atom through an unhalogenated carbon atom of the group, since the steric hindrance is increased, and then the high voltage stability of the positive electrode collector is improved.

A compound comprising the halogenated alkyl group which is bonded to the VIb group atom through the unhalogenated carbon atom of the group may be a compound of the formula (I):

$$[(Rf-O-Y)_2-X]_nM \qquad (I)$$

wherein M is a metal atom, n is a valency of the metal M, X is an atom of the Vb group of the Periodic Table, Y is a $SO_2$ group or a CO group, Rf is an electron attractive group comprising a fluorine atom in which no halogen atom is bonded to an atom bonded to the oxygen atom or the atom bonded to the oxygen atom has at least one hydrogen atom, provided that Rf may be bonded to the O—Y—X at least at two sites. A specific example of such compound is $(RfCH_2OSO)_2NLi$.

The halogenated alkyl group is branched at the middle of the chain preferably, since the high voltage stability is further increased. Examples of the compound having the branched halogenated alkyl group are $[(CF_3)_2CHOSO_2]_2NLi$, $[(CF_3)_2CFCH_2OSO_2]_2NLi$, and so on.

Examples of the counter ion in the present compound are a hydrogen ion, metal ions such as ions of alkali metals (e.g. lithium, sodium, potassium, etc.) and ions of alkaline earth metals (e.g. magnesium, calcium, etc.), and so on. Among them, the alkali metal ions, in particular, the lithium ion are preferred.

To prepare the liquid ion conductive material (the electrolytic solution) comprising the present compound, the present compound is dissolved in an organic solvent preferably. Examples of the organic solvent are esters such as propylene carbonate, ethylene carbonate, butylene carbonate, γ-butyrolactone, γ-valorolactone, dimethyl carbonate, methyl propionate, butyl acetate, etc.; ethers such as 1,2-dimethoxyethane, dimethoxymethane, dimethoxypropane, 1,3-dioxolane, tetrahydrofuran, 2-methyltetrahydrofuran, 4-methyl-1,3-dioxolane, etc.; sulforane; and so on. Among them, the esters are preferred to increase the high voltage stability of the liquid ion conductive material. In particular, the carbonates are preferred.

When an improved high voltage stability is desired, the present compound is polymerized or oligomerized, whereby the compound functions as a solid ion conductive material (a solid electrolyte). Examples thereof are polymers represented by the formula:

[—Rf—CH$_2$OSO$_2$N(Li)SO$_2$—O—]$_m$ wherein Rf is a fluoroalkyl group having 1 to 20 carbon atoms, m is a polymerization degree and usually from 2 to 100, and the like. Such polymer or oligomer is a novel compound.

The ion conductive material of the present invention is preferably a composite material in which the present compound and a carrier such as a porous polymer, an insulating inorganic compound (e.g. alumina, zeolite, etc.), polyethylene oxide, polypropylene oxide, polymethyl methacrylate or their derivatives are present together.

To synthesize the present compound, in the case of the metal salt, XSO$_2$NHSO$_2$X in which X is a halogen atom, preferably Cl is reacted with Rf—CH$_2$OH and so on to obtain (Rf—CH$_2$OSO$_2$)NH, and (Rf—CH$_2$OSO$_2$)NH is neutralized with Li$_2$CO$_3$ to obtain (Rf—CH$_2$OSO$_2$)—NLi. Theses compounds are stable up to about 200° C.

In the case of the polymer or oligomer, when a secondary alcohol (e.g. HOCH$_2$Rf"CH$_2$OH) is used as an alcohol to be reacted, (—Rf"—CH$_2$OSO$_2$N(H)SO$_2$O—$_m$ is obtained, and then this product is neutralized with the lithium salt. In one example, [N(Li)SO$_2$OCH$_2$—(CF$_2$)$_4$CH$_2$OSO$_2$]$_{9-10}$ is synthesized unsin HOCH$_2$(CF$_2$)$_4$CH$_2$OH.

A polymeric liquid ion conductive material (an electrolytic solution) comprising [N(Li)SO$_2$OCH$_2$(CF$_2$)$_4$CH$_2$OSO$_2$]$_{9-10}$ dissolved in acetonitrile (80 wt. % of acetonitrile and 20 wt. % of the polymer) exhibits a high ion conductivity of 8.9 mS/cm at 25° C.

When the liquid ion conductive material (the electrolytic solution) is prepared by dissolving the present compound in the organic solvent, a concentration of the present compound is not limited and is usually from 0.01 to 2 mol/l, preferably from about 0.05 to 1 mol/l.

When an electrochemical device, in particular, a nonaqueous cell is assembled using the ion conductive material of the present invention, an electrode comprising a compound containing an alkali metal or an alkaline earth metal which is integrated with an electrode collector such as copper, nickel or a metal net of stainless steel is used as a negative electrode.

Examples of the alkali metal are lithium, sodium, potassium, and so on, and examples of the compound containing the alkali metal are alloys of the alkali metal with aluminum, lead, indium, calcium, cadmium, tin, magnesium, etc., a compound of the alkali metal and a carbon material, a low potential compound of alkali metal and a metal oxide or a metal sulfide, and so on.

As a positive electrode, there is used an electrode which is prepared by molding a positive electrode active material such as a metal oxide (e.g. lithium cobalt oxide, lithium nickel oxide, LiMn$_2$O$_4$, manganese oxide, vanadium pentoxide, chromium oxide, etc.), a metal sulfide (e.g. molybdenum disulfide, etc.) or a mixture of the positive electrode active material and a conducting aid (e.g. graphite, etc.) or a binder (e.g. polytetrafluoroethylene, etc.) around a collector made of aluminum, tungsten, a metal net of stainless steel, and so on as a core member.

Since the present compound is stable at the high voltage, preferably the positive electrode active material which has the high voltage of at least 4 V, in particular, at least 4.2 V in relation to Li when it is charged (e.g. the lithium cobalt oxide, the lithium nickel oxide and LiMn$_2$O$_4$) is used.

As the positive electrode collector, a metal which has the trivalency when it is dissolved in the liquid ion conductive material (e.g. aluminum, tungsten, etc.) is preferred.

As a surface area of the positive electrode active material is decreased, the high voltage stability is further improved. Preferably, the positive electrode active material to be used in the present invention has a surface area of 50 m$^2$/g or less, more preferably 30 m$^2$/g or less, in particular, 20 m$^2$/g or less.

Preferably, an active surface of the metal oxide of the positive electrode active material is treated with a compound of the alkali metal or alkaline earth metal, in particular, a carbonate thereof so that the metal oxide contains the alkali metal or alkaline earth metal, whereby the high voltage stability is further improved.

The present invention will be illustrated by the following examples.

SYNTHESIS EXAMPLE 1

In a two-necked flask equipped with a 50 ml bubbler and a drying tube containing calcium chloride, bis (chlorosulfonyl)amine (2.55 g) was charged, and distilled hexafluoro-2-propanol (20 ml) was added while stirring with a magnetic stirrer. The reaction mixture was heated for 43 hours under a refluxing condition, during which a hydrogen chloride gas was slowly generated. The excessive alcohol was evaporated off by an evaporator to obtain a hygroscopic white solid (5.67 g).

The white solid was purified by sublimation at 80° C. under pressure of 0.25 mmHg using an ice trap to obtain colorless crystalline [(CF$_3$)$_2$CHOSO$_2$]$_2$NH (5.36 g).

In a 50 ml two-necked flask, the crystalline compound (1.25 g) was dissolved in acetonitrile (15 ml). To the solution, lithium carbonate (purity, 99.999 %) (0.0968 g) was gradually added at room temperature while stirring with a magnetic stirrer, following by sonication for one hour during which carbon dioxide was slowly generated. The reaction mixture was weakly acidic.

After filtrating the reaction mixture, acetonitrile was evaporated off by an evaporator to obtain a colorless liquid. The liquid was dried at 100° C. under pressure of 0.05 mmHg for 2 hours to remove residuaf acids to obtain a highly hygroscopic white powdery [(CF$_3$)$_2$CHOSO$_2$]$_2$NLi (1 g). The results of analyses of this compound are as follows:

Melting point: 194–197° C. (decomposition).
$^1$H-NMR (CD$_3$CN/TMS): ε; 3.76 (b, H$_2$O), 5.50 (h, CH, $^2$J (F–H)=6 Hz).
$^{19}$F-NMR (CD$_3$CN/C$_6$F$_6$): δ; 90.84 (d, CF$_3$, $^2$J (F–H)=7 Hz).

SYNTHESIS EXAMPLE 2

In a two-necked flask equipped with a 50 ml bubbler and a drying tube containing calcium chloride, bis (chlorosulfonyl)amine (2.75 g) and anhydrous benzene (20 ml) were charged, and distilled 2,2,3,3,3-pentafluoropropanol (3.85 g) was added while stirring with a magnetic stirrer. The reaction mixture was heated for one hour under a refluxing condition, during which a hydrogen chloride gas was slowly generated. Benzene and unreacted alcohol were evaporated off by an evaporator to obtain a hygroscopic colored solid (5.67 g).

The colored solid was purified by sublimation at 90° C. under pressure of 0.15 mmHg using an ice trap to obtain colorless crystalline (CF$_3$CF$_2$CH$_2$OSO$_2$)$_2$NH(5.11 g).

In a 50 ml two-necked flask, the crystalline compound (4.42 g) was dissolved in water (20 ml). To the solution, lithium carbonate (purity, 99.999%) (0.3699 g) was gradually added at room temperature while stirring with a magnetic stirrer, and reacted at 100° C. for one hour during which carbon dioxide was slowly generated. The reaction mixture had pH of about 7.

After filtrating the reaction mixture, water was evaporated off by an evaporator to obtain a colorless solid. The solid was dried at 100° C. under pressure of 0.05 mmHg for 1.5 hours to obtain a highly hygroscopic white powdery $(CF_3CF_2CH_2OSO_2)_2NLi$ (4.10 g). The results of analyses of this compound are as follows:

Melting point: 210° C. (decomposition).
$^1$H-NMR ($CD_3CN$/TMS): δ; 3.05 (s, $H_2O$), 4.67 (t, q, $CH_2$, $^2J$ (F-H)=13 $^{19}$Hz, $^3J$ (F-H)=0.98 Hz).
$^{19}$F-NMR ($CD_3CN/C_6F_6$): δ; 40.32 ($CF_2$), 80.19 ($CF_3$).

SYNTHESIS EXAMPLE 3

In a two-necked flask equipped with a 50 ml bubbler and a drying tube containing calcium chloride, bis(chlorosulfonyl)amine (2.88 g) and anhydrous benzene (20 ml) were charged, and distilled 2,2,3,3-tetrafluoropropanol (3.56 g) was added while stirring with a magnetic stirrer. The reaction mixture was heated for one hour under a refluxing condition, during which a hydrogen chloride gas was slowly generated. Benzene was evaporated off by an evaporator to obtain a hygroscopic brown solid (5.99 g).

The brown solid was purified by sublimation at 120° C. under pressure of 0.05 mmHg using a cold-finger trap kept at −90° C. to obtain colorless crystalline $(HCF_2CF_2CH_2OSO_2)_2NH$ (5.26 g).

In a 50 ml two-necked flask, the crystalline compound (4.19 g) was dissolved in water (20 ml). To the solution, lithium carbonate (purity, 99.999%) (0.3824 g) was gradually added at room temperature while stirring with a magnetic stirrer, heated to 100° C. and reacted at the same temperature for one hour during which carbon dioxide was slowly generated. The reaction mixture had pH of about 7.

After filtrating the reaction mixture, water was evaporated off by an evaporator to obtain a colorless solid. The solid was dried at 100° C. under pressure of 0.05 mmHg for 2 hours to obtain a highly hygroscopic white powdery $(HCF_2CF_2CH_2OSO_2)_2NLi$ (3.86 g). The results of analyses of this compound are as follows:

Melting point: 200° C. (decomposition).
$^1$H-NMR (CD3CN/TMS): δ; 2.91 (s, $H_2O$), 4.42 (t, t, $CH_2$, $^2J$ (F-H)=13 Hz, 3J (F-H)=1.7 Hz), 6.19 (t, t, $CF_2H$, $^1J$ (F-H)=52 Hz, $^2J$ (F-H)=5 Hz).
$^{19}$F-NMR ($CD_3CN/C_6F_6$): δ; 23.82 (d, t, $CF_2$, 1J (F-H)=52 Hz, 2J (F-H)=5 Hz), 37.88 (m, $CF_2$).

SYNTHESIS EXAMPLE 4

In a two-necked flask equipped with a 50 ml bubbler and a drying tube containing calcium chloride, bis(chlorosulfonyl)amine (2.42 g) and anhydrous benzene (20 ml) were charged, and distilled 2,2,2-trifluoroethanol (2.25 g) was added while stirring with a magnetic stirrer. The reaction mixture was heated for one hour under a refluxing condition. After the cease of generation of a hydrogen chloride gas, benzene and the unreacted alcohol were evaporated off by an evaporator to obtain a hygroscopic colored solid (3.70 g).

The colored solid was purified by sublimation at 80° C. under pressure of 0.2 mmHg using an ice trap to obtain colorless crystalline $(CF_3CH_2OSO_2)_2NH$ (3.48 g).

After performing the above reaction twice, this compound (6.10 g) was dissolved in water (20 ml) in a 50 ml two-necked flask. To the solution, lithium carbonate (purity, 99.999%) (0.6610 g) was gradually added at room temperature while stirring with a magnetic stirrer and heated at 100° C. for one hour during which carbon dioxide was slowly generated. The reaction mixture had pH of about 7.

After filtrating the reaction mixture, water was evaporated off by an evaporator to obtain a colorless solid. The solid was dried at 100° C. under pressure of 0.4 mmHg for 3 hours to obtain a highly hygroscopic white powdery $(CF_3CH_2OSO_2)_2NLi$ (6.03 g). The results of analyses of this compound are as follows:

Melting point: 210° C. (decomposition).
$^1$H-NMR ($CD_3CN$/TMS): δ; 2.93 (s, $H_2O$), 4.46 (q,$CH_2$ $^2J$ (F-H)=8 Hz).
$^{19}$F-NMR ($CD_3CN/C_6F_6$): δ; 89.78 (t, 6F, $CF_3$, $^2J$ (F-H)=8 Hz).

SYNTHESIS EXAMPLE 5

In a two-necked flask equipped with a 50 ml bubbler and a drying tube containing calcium chloride, 2,2,3,3,4,4,5,5-octafluoro-1,6-hexanediol (2.57 g) and anhydrous benzene (20 ml) were charged, and a solution of bis(chlorosulfonyl)amine (2.10 g) in benzene was added while stirring with a magnetic stirrer. The reaction mixture was heated for one hour under a refluxing condition during which a hydrogen chloride gas was slowly generated. After the termination of the reaction, a polymer was obtained as a precipitate in the reactor. The precipitate was separated by filtration and dried to obtain $[HNSO_2OCH_2(CF_2)_4CH_2OSO_2]_{9\text{-}10}$ (3.26 g).

This solid compound (1.30 g) was dissolved in water (15 ml) in a 50 ml two-necked flask. To the solution, lithium hydroxide (0.080 g) was gradually added at room temperature while stirring with a magnetic stirrer.

After filtrating the reaction mixture, water was evaporated off by an evaporator, and the residue was purified with acetonitrile, followed by evaporating the solvent off to obtain a very viscous liquid. The liquid was dried at 100° C. under pressure of 0.05 mmHg for 3 hours to obtain a highly hygroscopic pale brown powdery $[LiNSO_2OCH_2(CF_2)_4CH_2]_{9\text{-}10}$ (1.30 g)

Molecular weights of the product were measured by gel permeation chromatography to find that a number average molecular weight was 3400 and a weight average molecular weight was 4300.

The results of analyses of this compound are as follows:
Melting point: ≦150° C.
$^1$H-NMR ($CD_3CN$/TMS): δ; 3.00 (b, $H_2O$), 4.56 (t, $CH_2$), 4.00 (t, $CH_2$).
$^{19}$F-NMR ($CD_3CN/C_6F_6$): δ; 40.63 (m), 44.08 (m), 41.80 (m).

In the Synthesis Examples, the melting point was measured with a MP-S3 melting point meter manufactured by YANACO, and NMR spectra were measured with a JOEL FX-10OFT NMR.

EXAMPLE 1

Using $[(CF_3)_2CHOSO_2]_2NLi$ obtained in Synthesis Example 1 as an electrolyte, an electrolytic solution (a liquid ion conductive material) was prepared in the following manner. It is to be noted that, in $[(CF_3)_2CHOSO_2]_2NLi$, the electron attractive organic group $[(CF_3)_2CH—]$ is bonded to the $(—SO_2)_2N—$ group as the anionic center through the oxygen atom.

The electrolytic solution was prepared by adding propylene carbonate to $[(CF_3)_2CHOSO_2]_2NLi$ and mixing them to dissolve [(CF$_3$)$_2$CHOSO$_2$]$_2$NLi in propylene carbonate. A concentration of [(CF$_3$)$_2$CHOSO$_2$]$_2$NLi in the electrolytic solution was 0.1 mol/l. The composition of this electrolytic solution is expressed by 0.1 mol/l[(CF$_3$)$_2$CHOSO$_2$]$_2$NLi/ PC. PC is an abbreviation of propylene carbonate.

Then, 0.1 mol/l[(CF$_3$)$_2$CHOSOO$_2$]$_2$NLi/PC expressing the composition of the above electrolytic solution means that [(CF$_3$)$_2$CHOSO$_2$]$_2$NLi was dissolved in propylene carbonate at a concentration of 0.1 mol/l.

Next, polyvinylidene fluoride (4 wt. parts) was dissolved in N-methylpyrrolidone, and to the solution, LiCoO$_2$ (90 wt. parts) as a positive electrode active material and a graphite (6 wt. parts) as a conducting aid were added and mixed to obtain a slurry. The positive electrode mixture slurry was uniformly coated on both surfaces of a positive electrode collector made of an aluminum foil having a thickness of 20 μm, dried and press molded by a roller press (a thickness of the mixture: 75 μm). The molded sheet was cut to a determined size, and a lead wire was welded to assemble a positive electrode.

Around the positive electrode, a lithium foil negative electrode having the welded lead wire was laminated with interposing a separator made of a microporous polyethylene film having a thickness of 34 μm, and the whole composite was inserted in a polyethylene bag. In the bag, the above electrolytic solution was poured, and an upper edge of the bag was heat sealed to assemble a thin nonaqueous secondary cell.

EXAMPLE 2

In the same manner as in Example 1 except that (CF$_3$CF$_2$CH$_2$OSO$_2$)$_2$NLi synthesized in Synthesis Example 2 was used in place of [(CF$_3$)$_2$CHOSO$_2$]$_2$NLi, an electrolytic solution was prepared. Then, in the same manner as in Example 1 except that this electrolytic solution was used, a nonaqueous secondary cell was assembled.

EXAMPLE 3

In the same manner as in Example 1 except that (HCF$_2$CF$_2$CH$_2$OSO$_2$)$_2$NLi synthesized in Synthesis Example 3 was used in place of [(CF$_3$)$_2$CHOSO$_2$]$_2$NLi, an electrolytic solution was prepared. Then, in the same manner as in Example 1 except that this electrolytic solution was used, a nonaqueous secondary cell was assembled.

EXAMPLE 4

In the same manner as in Example 1 except that (CF$_3$CH$_2$OSO$_2$)$_2$NLi synthesized in Synthesis Example 4 was used in place of [(CF$_3$)$_2$CHOSO$_2$]$_2$NLi, an electrolytic solution was prepared. Then, in the same manner as in Example 1 except that this electrolytic solution was used, a nonaqueous secondary cell was assembled.

EXAMPLE 5

[LiNSO$_2$OCH$_2$(CF$_2$)$_4$CH$_2$OSO$_2$]$_{9-10}$ synthesized in Synthesis Example 5 was used in place of [(CF$_3$)$_2$CHOSO$_2$]$_2$NLi, and this polymer was dissolved in a mixed solvent of propylene carbonate (PC) and dimethoxyethane (DME) (volume ratio 1:2) to prepare an electrolytic solution. Then, in the same manner as in Example 1 except that this electrolytic solution was used, a nonaqueous secondary cell was assembled.

Comparative Example 1

In the same manner as in Example 1 except that (CF$_3$SO$_2$)$_2$NLi was used in place of [(CF$_3$)$_2$CHOSO$_2$]$_2$NLi, an electrolytic solution was prepared. Then, in the same manner as in Example 1 except that this electrolytic solution was used, a nonaqueous secondary cell was assembled.

The oxidation stability of each of the electrolytic solutions prepared in Examples 1–4 and Comparative Example 1 was measured as follows:

As a working electrode of a cell for measuring the oxidation stability, a platinum wire having a diameter of 0.3 mm manufactured by NILACO was used, while as a counter electrode, a lithium film (width of 21 mm) manufactured by KYOKUTO KINZOKU KABUSHIKIKAISHA was used. A facing surface area of the counter electrode was 0.2 cm$^2$. Between the working electrode and the counter electrode, a microporous film of polyethylene as a separator was inserted.

The assembled cell was subjected to potential sweep at a sweep speed of 50 mV/sec. using a potentiostat (HA-501) and a function generator (HB-104) both manufactured by HOKUTO DENKO CORPORATION. A potential at which an electric current density reached 0.5 mA/cm$^2$ was regarded as an oxidation voltage and used as a criterion for the oxidation stability of the electrolytic solution.

The oxidation voltage is a measure of the high voltage stability of the electrolytic solution. The higher oxidation voltage means the better high voltage stability. But, the oxidation voltage does not mean that the electrolytic solution is not decomposed at all up to that potential.

The measured oxidation voltages of the electrolytic solutions of Examples 1–4 and Comparative Example 1 are shown in Table 3.

TABLE 3

| Electrolyte | | Oxidation voltage (V) (against Li/Li$^+$) |
|---|---|---|
| Example 1 | [(CF$_3$)$_2$CHOSO$_2$]$_2$NLi | 5.8 |
| Example 2 | (CF$_3$CF$_2$CH$_2$OSO$_2$)$_2$NLi | 5.6 |
| Example 3 | (HCF$_2$CF$_2$CH$_2$OSO$_2$)$_2$NLi | 5.5 |
| Example 4 | (CF$_3$CH$_2$OSO$_2$)$_2$NLi | 5.4 |
| Comp. Example 1 | (CF$_3$SO$_2$)$_2$NLi | 5.2 |

As shown in Table 3, the electrolytic solutions of Examples 1–4 had the higher oxidation voltages than that of Comparative Example 1.

In a dry atmosphere, each of the cells assembled in Examples 1–4 and Comparative Example 1 was charged at 0.5 mA/cm$^2$ for 3 hours. If the cell voltage reached the upper limit voltage of 4.2 V, the charging was terminated. Thereafter, each cell was discharged at 0.5 mA/cm$^2$ to 2.75 V to measure a discharge capacity. The results are shown in Table 4. The numerals are relative values of the discharge capacities with the discharge capacity of Example 1 being 100.

TABLE 4

| | Discharge capacity (relative value) |
|---|---|
| Example 1 | (100) |
| Example 2 | 84 |
| Example 3 | 43 |
| Example 4 | 30 |
| Example 5 | 85 |
| Comp. Example 1 | 12 |

As is clear from the results in Table 4, the use of the ion conductive materials of the present invention increased the discharge capacities of the cells greatly when the cells were charged at the high voltage.

To find a reason for these results, each cell was disassembled. In the cell of Comparative Example 1, the aluminum metal of the positive electrode collector was dissolved in the liquid ion conductive material (electrolytic solution) and deposited on the negative electrode, while such dissolution or deposition was hardly found in the cells of Examples 1–4.

What is claimed is:

1. An ion conductive material containing a compound which comprises:
   (A) a resonance structure group which contains
      (i) an atom of the Vb group in the Periodic Table serving as an anionic site, and
      (ii) at least one stabilizing group bonded to (i), wherein said stabilizing group stabilizes (i);
   (B) an atom of the VIb group in the Periodic Table;
   (C) an electron attractive organic group; and
   (D) a counter ion selected from the group consisting of metal ions and a hydrogen ion, wherein said resonance structure group (A) is bonded to said electron attractive organic group (C) through said atom of the VIb group in the Periodic Table (B).

2. The ion conductive material according to claim 1, wherein said counter ion (D) is a metal ion, said atom of the Vb group in the Periodic Table (A)(i) is a nitrogen atom, and said electron attractive organic group (C) contains an unhalogenated carbon atom to which said atom of the VIb group in the Periodic Table (B) is bonded.

3. The ion conductive material according to claim 2, wherein said atom of the VIb group in the Periodic Table (B) is an oxygen atom.

4. The ion conductive material according to claim 1, wherein said compound is a compound of the formula (1):

$$((Rf\text{—}O\text{—}Y)_2\text{—}X)_n M \qquad (1)$$

wherein

M represents said counter ion (D) and is a metal atom, n is a valency of the metal M, X represents said atom of the Vb group in the Periodic Table (A)(i) and is a nitrogen atom, Y represents said stabilizing group (A)(ii) and is a $SO_2$ group or a CO group, O is an oxygen atom and represents said atom of the VIb group in the Periodic Table (B), and Rf represents said electron attractive organic group (C) which comprises a fluorine atom and an unhalogenated carbon atom, wherein said unhalogenated carbon atom in bonded to said oxygen atom which represents said atom of the VIb group in the Periodic Table (B).

5. The ion conductive material according to claim 1, which is an electrolytic solution.

6. The ion conductive material according to claim 1, wherein said electron attractive organic group is a branched halogenated alkyl group.

7. The ion conductive material according to claim 1, which is dissolved in an ester.

8. The ion conductive material according to claim 1, which is composited with a carrier selected from the group consisting of insulating inorganic compounds, polyethylene oxide, polypropylene oxide, polymethyl methacrylate and their derivatives.

9. An electrochemical device comprising an electrode and an ion conductive material containing a compound functioning as an electrolyte which comprises:
   (A) a resonance structure group which contains
      (i) an atom of the Vb group in the Periodic Table serving as an anionic site, and
      (ii) at least one stabilizing group bonded to (i), wherein said stabilizing group stabilizes (i);
   (B) an atom of the VIb group in the Periodic Table;
   (C) an electron attractive organic group; and
   (D) a counter ion selected from the group consisting of metal ions and a hydrogen ion, wherein said resonance structure group (A) is bonded to said electron attractive organic group (C) through said atom of the VIb group in the Periodic Table (B).

10. The electrochemical device according to claim 9, wherein said counter ion (D) is a metal ion, said atom of the Vb group in the Periodic Table (A)(i) is a nitrogen atom, and said electron attractive organic group (C) contains an unhalogenated carbon atom to which said atom of the VIb group in the Periodic Table (B) is bonded.

11. The electrochemical device according to claim 10, wherein said atom of the VIb group in the Periodic Table (B) is an oxygen atom.

12. The electrochemical device according to claim 9, wherein said compound is a compound of the formula (I):

$$((Rf\text{—}O\text{—}Y)_2\text{—}X)_n M \qquad (I)$$

wherein

M represents said counter ion (D) and is a metal atom, n is a valency of the metal M, X represents said atom of the Vb group in the Periodic Table (A)(i) and is a nitrogen atom, Y represents said stabilizing group (A)(ii) and is a $SO_2$ group or a CO group, O is an oxygen atom and represents said atom the VIb group in the Periodic Table (B), and Rf represents said electron attractive organic group (C) which comprises a fluorine atom and an unhalogenated carbon atom, wherein said unhalogenated carbon atom in bonded to said oxygen atom which represents said atom of the VIb group in the Periodic Table (B).

13. The electrochemical device according to claim 9, which is a device selected from the group consisting of a secondary cell, an electrolytic system and an electrochemical sensor.

14. The electrochemical device according to claim 9, wherein said electron attractive organic group is a branched halogenated alkyl group.

15. The electrochemical device according to claim 9, which comprises a positive electrode material having a voltage of at least 4.2 V in relation to Li when it is charged.

16. The electrochemical device according to claim 5, which comprises a positive electrode collector made of aluminum.

* * * * *